US010710622B2

(12) United States Patent
McDonald et al.

(10) Patent No.: US 10,710,622 B2
(45) Date of Patent: *Jul. 14, 2020

(54) GLASS HAND TRUCK

(71) Applicant: Oldcastle BuildingEnvelope, Inc., Dallas, TX (US)

(72) Inventors: William Joshua McDonald, Newborn, GA (US); Christopher Todd Herndon, Grayson, CA (US)

(73) Assignee: OLDCASTLE BUILDINGENVELOPE, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,426

(22) Filed: Apr. 17, 2019

(65) Prior Publication Data

US 2019/0241203 A1 Aug. 8, 2019

Related U.S. Application Data

(63) Continuation of application No. 15/615,127, filed on Jun. 6, 2017, now Pat. No. 10,266,191.

(51) Int. Cl.
*B62B 1/12* (2006.01)
*B62B 1/00* (2006.01)
(Continued)

(52) U.S. Cl.
CPC ............. *B62B 1/12* (2013.01); *B62B 1/008* (2013.01); *B62B 1/14* (2013.01); *B62B 1/268* (2013.01);
(Continued)

(58) Field of Classification Search
USPC .............. 280/652, 47.131, 47.34, 763.1
See application file for complete search history.

(56) References Cited

U.S. PATENT DOCUMENTS 3,655,212 A * 4/1972 Krass .................. B62B 3/04
280/641
3,797,849 A 3/1974 Sherman
(Continued)

FOREIGN PATENT DOCUMENTS

WO 2017146559 8/2017
WO WO-2017146559 A1 * 8/2017 ............ B60P 1/04

OTHER PUBLICATIONS

Machine language translation of WO 2017146559 A obtained from www.patenscope.wipo.int on Nov. 26, 2019.*
(Continued)

*Primary Examiner* — Paul N Dickson
*Assistant Examiner* — Hilary L Johns
(74) *Attorney, Agent, or Firm* — Kilpatrick Townsend & Stockton LLP

(57) ABSTRACT

A hand truck includes a frame, a handle attached to a rear side of the frame, a platform extending from a front side of the frame, a plurality of feet attached to an underside of the platform, at least one support member attached to the front side of the frame, and an axle supporting a plurality of wheels, wherein the axle is attached to the frame. The hand truck may include a standing configuration and a mobile configuration. In the standing configuration, the plurality of wheels and at least one of the plurality of feet contact a ground surface to support the hand truck such that the platform is arranged at an oblique angle with respect to the ground surface.

17 Claims, 6 Drawing Sheets

(51) Int. Cl.
  *B62B 1/14* (2006.01)
  *B62B 1/26* (2006.01)
  *B62B 3/00* (2006.01)
  *B62B 3/10* (2006.01)

(52) U.S. Cl.
  CPC .............. *B62B 3/009* (2013.01); *B62B 3/108* (2013.01); *B62B 1/00* (2013.01); *B62B 3/00* (2013.01); *B62B 2203/44* (2013.01); *B62B 2301/02* (2013.01)

(56) References Cited

U.S. PATENT DOCUMENTS

| | | | | |
|---|---|---|---|---|
| 4,360,211 A * | 11/1982 | Blake | ..................... | B62B 3/108 211/189 |
| 4,630,837 A * | 12/1986 | Kazmark | ................ | B62B 1/002 280/47.2 |
| 4,717,168 A | 1/1988 | Moon, Sr. | | |
| 4,887,837 A * | 12/1989 | Bonewicz, Jr. | ........... | B62B 1/12 280/654 |
| 5,120,072 A * | 6/1992 | Laramie | .................. | B62B 3/108 280/47.17 |
| 5,524,920 A * | 6/1996 | Tsai | ........................ | A45C 5/14 190/18 A |
| 5,549,317 A * | 8/1996 | Dunkle | .................... | B62B 1/12 280/47.19 |
| 5,626,352 A | 5/1997 | Grace | | |
| 5,984,326 A * | 11/1999 | Abraham | ................ | A45C 5/14 190/18 A |
| 6,237,925 B1 * | 5/2001 | Koenig | .................... | B62B 1/12 280/47.28 |
| 6,478,315 B1 * | 11/2002 | Manesis | .................. | A45C 5/14 16/34 |
| 6,926,643 B1 * | 8/2005 | Gvoich | .............. | A63B 23/0458 482/51 |
| 7,021,436 B2 * | 4/2006 | Hoberman | ................ | A45C 5/14 190/18 R |
| 7,025,363 B1 * | 4/2006 | Leight | ...................... | B62B 1/10 280/47.131 |
| 7,607,680 B2 | 10/2009 | Li | | |
| 8,366,124 B1 | 2/2013 | Caldwell | | |
| 9,187,106 B2 | 11/2015 | Khodor | | |
| 10,137,920 B1 * | 11/2018 | Bolden | ..................... | B62B 5/02 |
| 2002/0030351 A1 * | 3/2002 | Gillette | .................... | B62B 1/12 280/652 |
| 2008/0190797 A1 * | 8/2008 | Good | ..................... | B25H 3/00 206/349 |
| 2009/0121456 A1 * | 5/2009 | Li | ........................... | B62B 1/125 280/655.1 |
| 2009/0152825 A1 | 6/2009 | Adams | | |
| 2010/0327562 A1 * | 12/2010 | Kasuya | ..................... | A45C 5/14 280/651 |
| 2012/0049474 A1 * | 3/2012 | Del Rosario | ........... | B62B 1/008 280/47.34 |
| 2013/0037768 A1 * | 2/2013 | Hayes | .................... | B66C 23/48 254/327 |
| 2015/0166088 A1 * | 6/2015 | Khodor | .................. | B62B 1/042 280/639 |
| 2015/0217791 A1 * | 8/2015 | Leijdekkers | .......... | B62B 5/0433 280/79.11 |
| 2017/0295931 A1 * | 10/2017 | Macyszyn | .............. | A47B 91/02 |
| 2018/0346006 A1 * | 12/2018 | McDonald | ................ | B62B 1/12 |

OTHER PUBLICATIONS

Notice of Allowance from related U.S. Appl. No. 15/615,127 dated Dec. 10, 2011, 2018, 6 pages.

* cited by examiner

GLASS HAND TRUCK

CROSS-REFERENCE TO RELATED APPLICATION

This application is a continuation of and claims priority to U.S. patent application Ser. No. 15/615,127 filed on Jun. 6, 2017, the contents of which are incorporated herein by reference in their entirety.

FIELD OF INVENTION

The field of the invention relates to hand trucks for carrying large or cumbersome objects.

BACKGROUND

Many people transport equipment or other objects in a delivery vehicle but require a way to transport the equipment or other objects beyond where the delivery vehicle travels. For example, large objects such as panes of glass must be transported from a parking area to a different location within a facility or building. A solution is to bring a hand truck in the delivery vehicle. Existing devices often fail to provide an efficient folding mechanism, acceptable ergonomics, and/or sufficient capacity for large cumbersome objects. There is a need for improved devices and methods for hand trucks designed for large cumbersome objects.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a hand truck comprises: a frame; a handle attached to a rear side of the frame; a platform extending from a front side of the frame; a plurality of feet attached to an underside of the platform; at least one support member attached to the front side of the frame; and an axle supporting a plurality of wheels, wherein the axle is attached to the frame, wherein: the hand truck comprises a standing configuration and a mobile configuration; and in the standing configuration, the plurality of wheels and at least one of the plurality of feet contact a ground surface to support the hand truck such that the platform is arranged at an oblique angle with respect to the ground surface.

According to certain embodiments of the present invention, a hand truck comprises: a frame comprising a left 'U' shaped member and a right 'U' shaped member; a platform attached to a front side of the left 'U' shaped member and to a front side of the right 'U' shaped member; a plurality of feet attached to an underside of the platform; and an axle supporting two wheels, wherein the axle is attached to the frame, wherein: the hand truck comprises a standing configuration and a mobile configuration; and in the standing configuration, the two wheels and at least one of the plurality of feet contact a ground surface to support the hand truck such that the platform is arranged at an oblique angle with respect to the ground surface.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
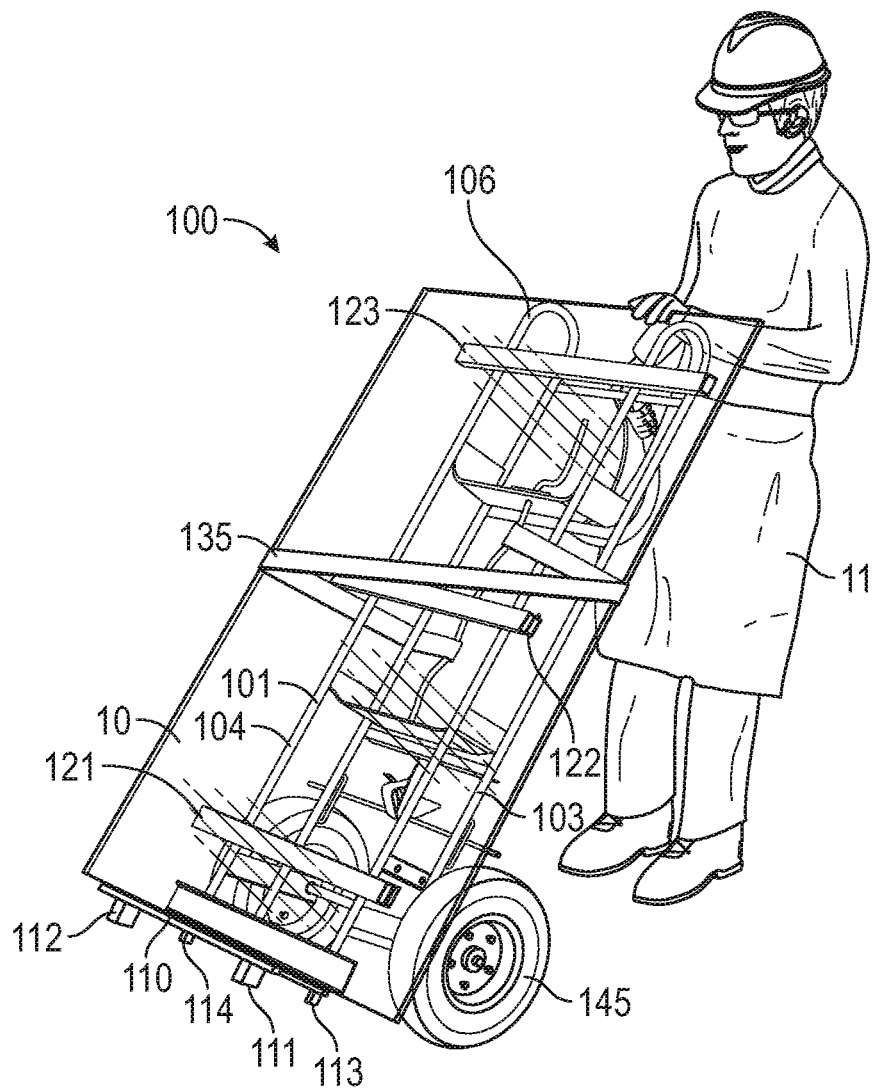
FIG. 1 is a front perspective view of a hand truck according to certain embodiments of the present invention.

FIGS. 1-6B illustrate embodiments of a hand truck 100. FIG. 1 shows the hand truck 100 holding at least one pane of glass 10 being manipulated by a user 11. The hand truck 100 may include a frame 101, a handle 102 attached to a rear side of the frame 101, a platform 110 on a forward side of the frame 101, at least one support member 121-123 on the forward side of the frame 101, and at least one wheel 145, 146. The hand truck 100 may include a standing configuration (see, e.g., FIG. 2) where the hand truck 100 can stand upright while supporting a large object (such as at least one pane of glass 10) with minimal risk of tipping over. In the standing configuration, the hand truck 100 contacts the ground in at least three locations including each wheel 145, 146 and at one location on the underside of the platform 110 (i.e., at least one of the feet 111-114 contact the ground). The hand truck 100 may also include a mobile configuration (see, e.g., FIG. 1) where the user 11 pivots the hand truck 100 about the axle 141 such that the platform 110 (and the feet 111-114) do not contact the ground and the hand truck 100 can roll via the wheels 145, 146 and the axle 141. The user 11 typically supports the hand truck 100 using at least one of the handle 102 and the frame 101 in the mobile configuration. References to a "wheel" herein are meant to include (i) a combination of a wheel and pneumatic or semi-pneumatic tire, (ii) a combination of a wheel and a solid rubber tire, (iii) a tire with a solid or non-removable hub, or (iv) any other appropriate wheel and/or tire.

Figure 2:
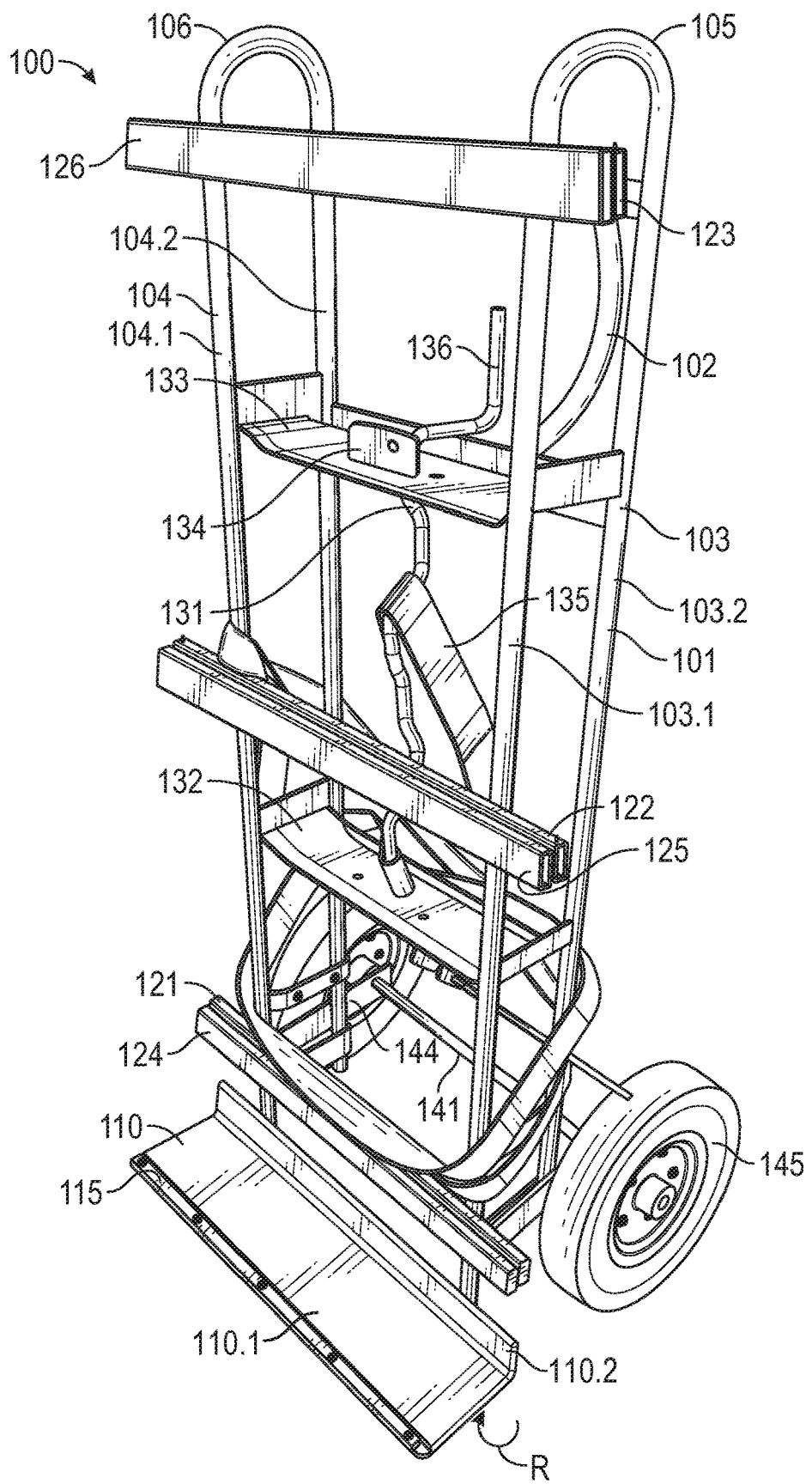
FIG. 2 is a front perspective view of the hand truck of FIG. 1.
Figure 3:
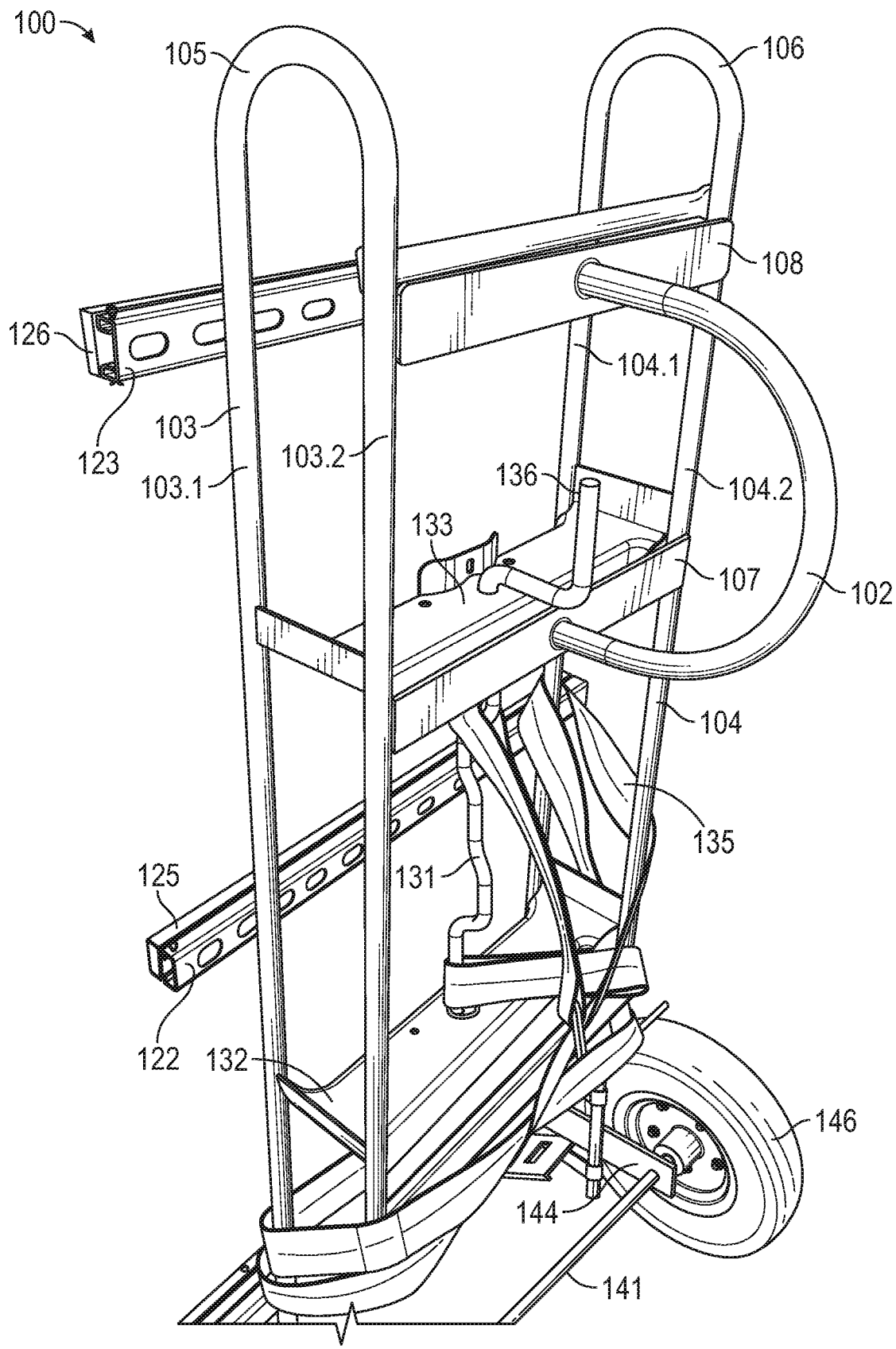
FIG. 3 is a rear perspective view of the hand truck of FIG. 1.
Figure 4:
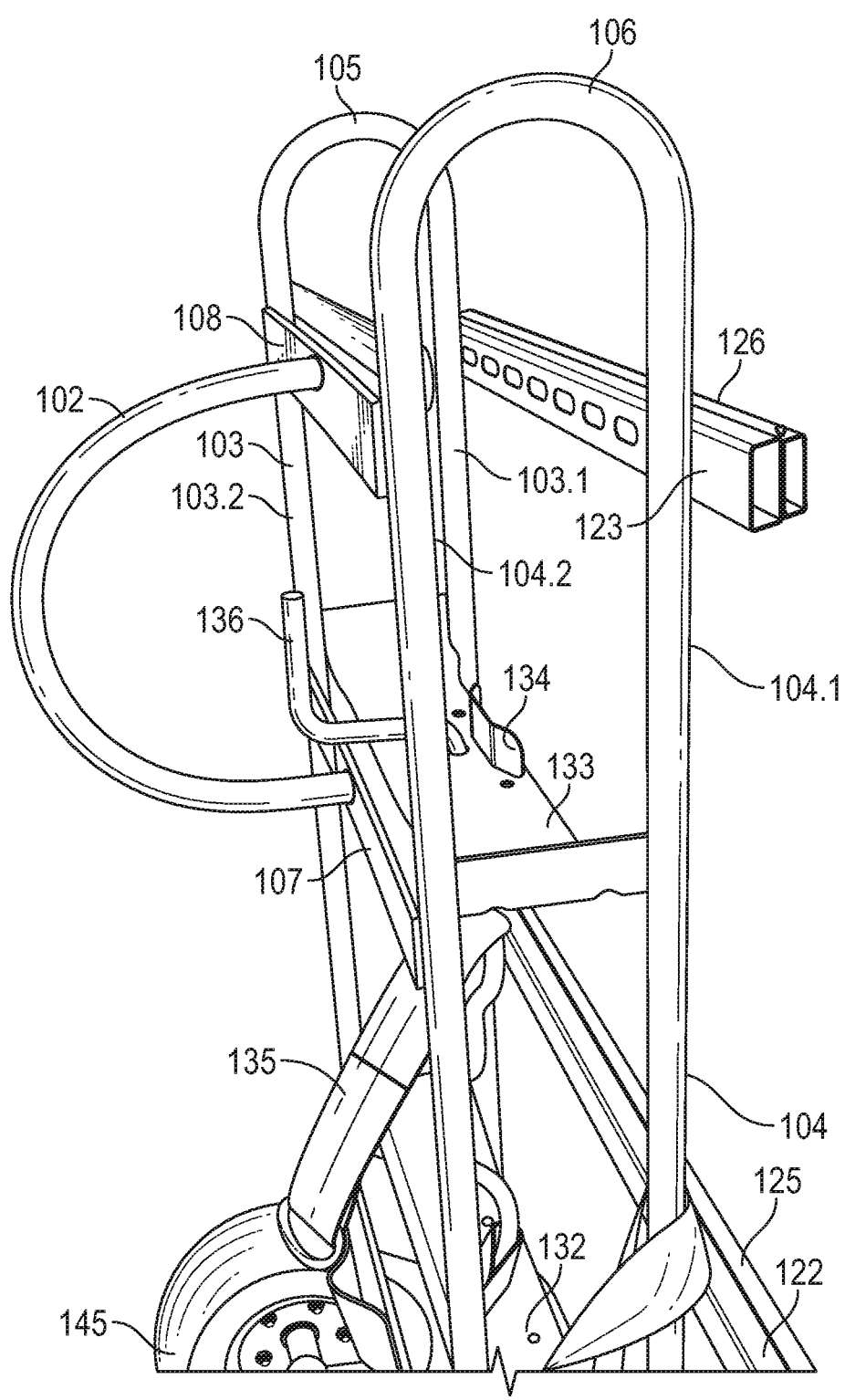
FIG. 4 is a right side perspective view of the hand truck of FIG. 1.
Figure 5:
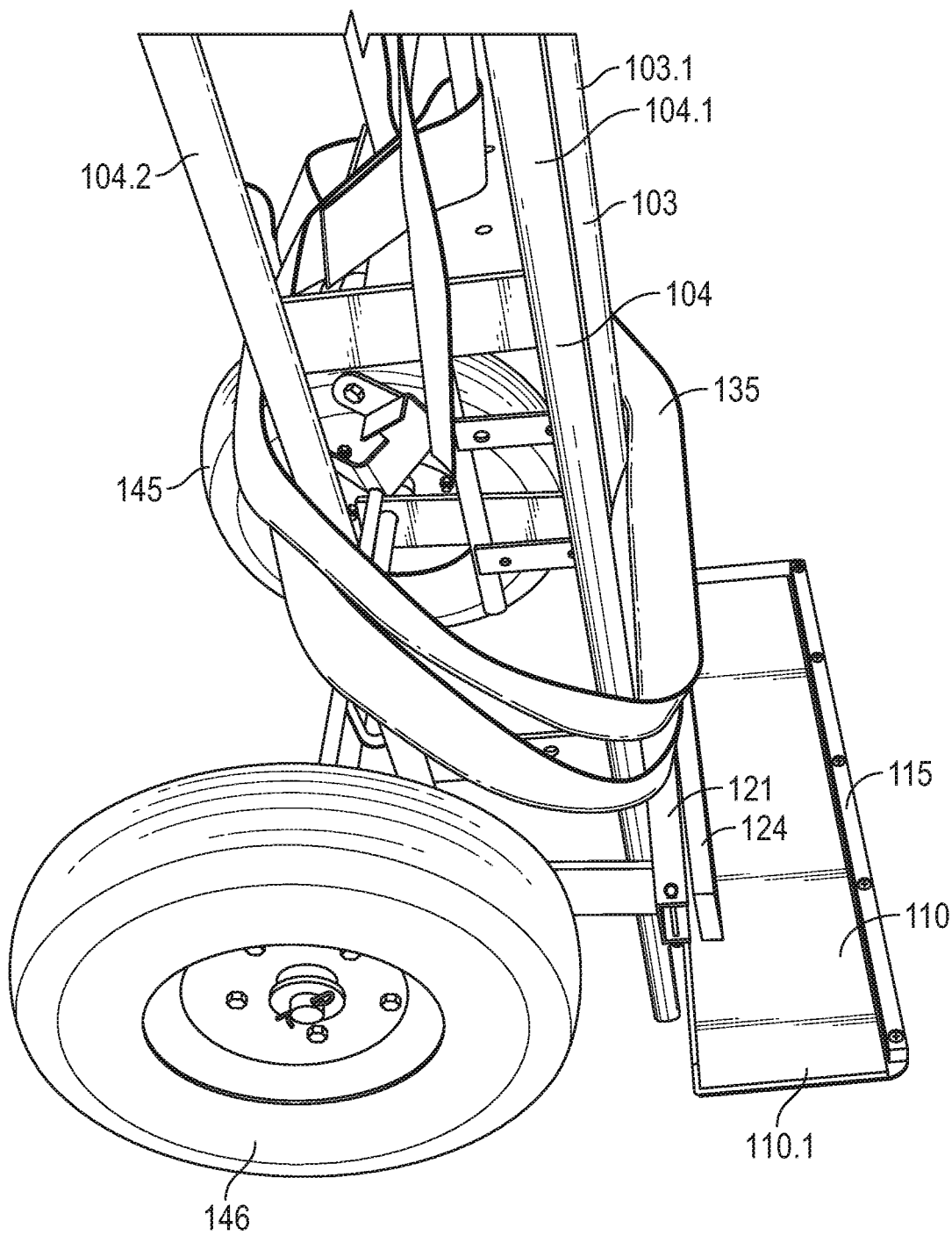
FIG. 5 is a partial right side perspective view of the hand truck of FIG. 1.

In some embodiments, the frame 101 includes a left member 103, a right member 104, a lower plate 132, an upper plate 133, and at least one rear brace member 107, 108. As shown in FIGS. 2 and 3, the left member 103 may be formed from a single component that is bent or formed in a 'C' or 'U' shape having a curved portion 105, a front portion 103.1, and a rear portion 103.2. In some embodiments, the front portion 103.1, the rear portion 103.2, and/or the curved portion 105 are separate components that are attached to one another (e.g., by welding, mechanical fasteners, chemical fastening, or any other appropriate method). Although the curved portion 105 is shown at the top of the left member 103, the curved portion 105 may be arranged at the bottom of the left member 103, and the curved portion 105 may have any other appropriate shape (e.g., including a straight segment between the front portion 103.1 and the rear portion 103.2). As shown in FIGS. 2-4, the right member 104 may be formed from a single component that is bent or formed in a 'C' or 'U' shape having a curved portion 106, a front portion 104.1, and a rear portion 104.2. In some embodiments, the front portion 104.1, the rear portion 104.2, and/or the curved portion 106 are separate components that are attached to one another (e.g., by welding, mechanical fasteners, chemical fastening, or any other appropriate method). Although the curved portion 106 is shown at the top of the right member 104, the curved portion 106 may be arranged at the bottom of the right member 104, and the curved portion 106 may have any other appropriate shape (e.g., including a straight segment between the front portion 104.1 and the rear portion 104.2).

As shown in FIGS. 2 and 3, the lower plate 132 may be a flat plate with a flange on at least one edge and may be attached to the front portion 103.1, the rear portion 103.2, the front portion 104.1, and the rear portion 104.2. Similarly, the upper plate 133 may be a flat plate with a flange on at least one edge and may be attached to the front portion 103.1, the rear portion 103.2, the front portion 104.1, and the rear portion 104.2. In some embodiments, the lower and upper plates 132 and 133 each include (i) flanges that extend upward at their respective side edges (i.e., between the front and rear portions of the frame 101) and (ii) flanges that extend downward at their respective front/rear edges (i.e., between the left member 103 and the right member 104). The lower and upper plates 132 and 133 increase stability of the frame 101 and react shear loads.

The platform 110 is attached to the front portion 103.1 of the left member 103 and the front portion 104.1 of the right member 104. As shown in FIG. 2, the platform 110 includes a lower portion 110.1 and an upright portion 110.2. In some embodiments, the lower portion 110.1 is pivotably attached to the upright portion 110.2 such that the lower portion 110.1 has a deployed position (as shown in the drawings) and a retracted position (not shown) where the lower portion 110.1 folds up and against the frame 101 when the hand truck 100 is stored or not being used (see rotation direction R in FIG. 2). The lower portion 110.1 may be covered in rubber to grip objects (such as panes of glass 10) and may also include a protrusion 115 to prevent objects from sliding off the lower portion 110.1. The protrusion 115 may be thermoplastic polyethylene or any other appropriate material. In some embodiments, when the lower portion 110.1 is in the deployed position, the frame 101 and the lower portion 110.1 form an acute angle, which along with the protrusion 115, prevents objects from sliding off the lower portion 110.1. In other words, when the lower portion 110.1 rotates from the deployed position to the retracted position, the rotation angle is less than 90°. The platform 110 may be arranged at a 90° angle relative to the frame 101 where the mounting structure for the axle 141 is attached to the frame 101 at an oblique angle (see description of axle mount members 143 and 144 below) such that the platform 110 is not parallel to the ground when the hand truck 100 is in the standing configuration. In some embodiments, the lower portion 110.1 may include a biasing mechanism (including, for example, one or more of a detent, a spring, or any other appropriate mechanism) that biases the lower portion 110.1 toward at least one of the deployed position and the retracted position.

To support the hand truck 100 in the standing configuration, the underside of the lower portion 110.1 includes at least one foot that interfaces with the ground to secure the hand truck 100 (see FIG. 1). In some embodiments, to match the acute angle described above, the two front feet 111 and 112 (closer to the outer edge of the lower portion 110.1) are taller than the two rear feet 113 and 114 (closer to the frame 101). The feet 111-114 may include a compliant material that ensures sufficient grip when the feet engage the ground. The feet 111-114 may also include a durable material. The feet 111-114 also raise the platform 110 off the ground to provide clearance between the object (such as a pane of glass 10) and the ground. In some embodiments, the feet 111-114 provide a clearance between the bottom of the platform 110 and the ground of at least 1".

On the front side of the frame 101, the hand truck 100 includes at least one support member. In some embodiments, as illustrated in the drawings, the hand truck 100 includes three support members 121, 122, and 123. However, the hand truck 100 may include any number of support members such as two, four, five, or more. The lower support member 121 is attached to the front portion 103.1 of the left member 103 and the front portion 104.1 of the right member 104. The lower support member 121 may be attached at approximately the same height as the wheels 145, 146 and, as shown in the figures, the lower support member 121 may be attached above the axle 141 (when viewed from the front or rear).

The middle support member 122 is attached to the front portion 103.1 of the left member 103 and the front portion 104.1 of the right member 104. The middle support member 122 may be attached at approximately half the vertical height of the frame 101 and/or may be attached approximately half way between the lower support member 121 and the upper support member 123.

The upper support member 123 is attached to the front portion 103.1 of the left member 103 and the front portion 104.1 of the right member 104. The upper support member 123 may be attached at or near the connection between the curved portions 105, 106 and the front portions 103.1, 104.1, respectively.

The length of the support members 121-123 may be approximately equal to (i) the width of the platform 110 or (ii) the total width between the outer surfaces of the two wheels 145, 146. However the length of the support members 121-123 may be any appropriate size ranging from (i) the distance between the front portion 103.1 of the left member 103 and the front portion 104.1 of the right member 104 to (ii) a multiple of the width of the platform 110. In other words, the support members 121-123 may be as long as 1.5× the width of the platform 110, 2× the width of the platform 110, 3× the width of the platform 110, 5× the width of the platform 110, or any other appropriate length needed to accommodate large panes of glass 10. The support members 121-123 may be a flexible or compliant material for interfacing with objects such as panes of glass 10. In some embodiments, as shown in the drawings, the support members 121-123 may each be members having a box or "C" cross section, which are configured to attach replaceable and/or sacrificial components such as padding members 124, 125, and 126, respectively. The padding members 124-126 may be a flexible or compliant material such as rubber or plastic and have a length that is equal to or longer than the length of the support members 121-123. The padding members 124-126 may attach to the support members 121-123 using adhesive, mechanical fasteners (such as vertically extending pins), and/or any other appropriate attachment.

As shown in FIGS. 3 and 4, the lower rear brace member 107 and the upper rear brace member 108 are each attached to the rear portion 103.2 of the left member 103 and the rear portion 104.2 of the right member 104. A handle 102 attaches to the lower rear brace member 107 and the upper rear brace member 108. The handle 102 may be a single piece extending between the lower rear brace member 107 and the upper rear brace member 108 (as shown in FIGS. 3 and 4) or may be multiple components attached to one another. As shown in FIG. 3, the handle 102 may have straight segments extending rearward from the rear brace members 107, 108 and a curved portion that is approximately semicircular or may have any other appropriate shape (such as oval, square, rectangular, triangular, etc.). The handle 102 extends rearward from the frame 101 to allow the user 11 to secure the hand truck 100 in the mobile configuration. The handle 102 allows the user 11 to carry an object (such as a pane of glass 10) that is taller than the user 11 (i.e., the offset of the handle 102 allows the user 11 to step rearward from the frame 101).

The hand truck 100 may include a strap 135 and articulating rod 131 for securing objects to the hand truck 100 (see FIGS. 1-5). As shown in FIG. 1, the strap 135 is wrapped around an object (such as a pane of glass 10) and each end of the strap 135 is attached to the articulating rod 131. After the strap 135 is looped around the object, the handle 136 may be used to rotate the articulating rod 131. Due to the cammed profile of the articulating rod 131, rotation causes the strap 135 to be pulled in tension around the object. As shown in FIGS. 2-4, the articulating rod 131 extends between the lower plate 132 and toward and through the upper plate 133 where the handle 136 of the rod 131 is disposed above the upper plate 133. There may be a bracket 134 attached to an upper side of the upper plate 133 that secures the articulating rod 131. In some embodiments, each of the lower and upper plates 132 and 133 are attached to the front and rear portions of the left member 103 and of the right member 104.

Figure 6A:
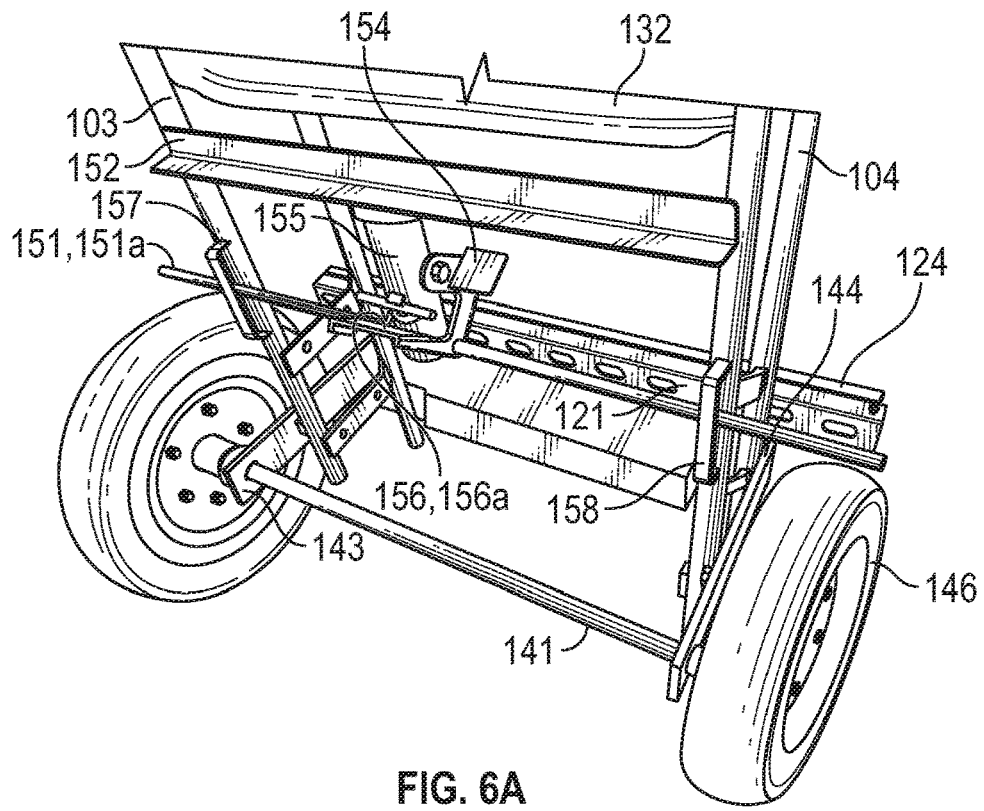
FIGS. 6A and 6B are partial rear perspective views of the hand truck of FIG. 1.
Figure 6B:
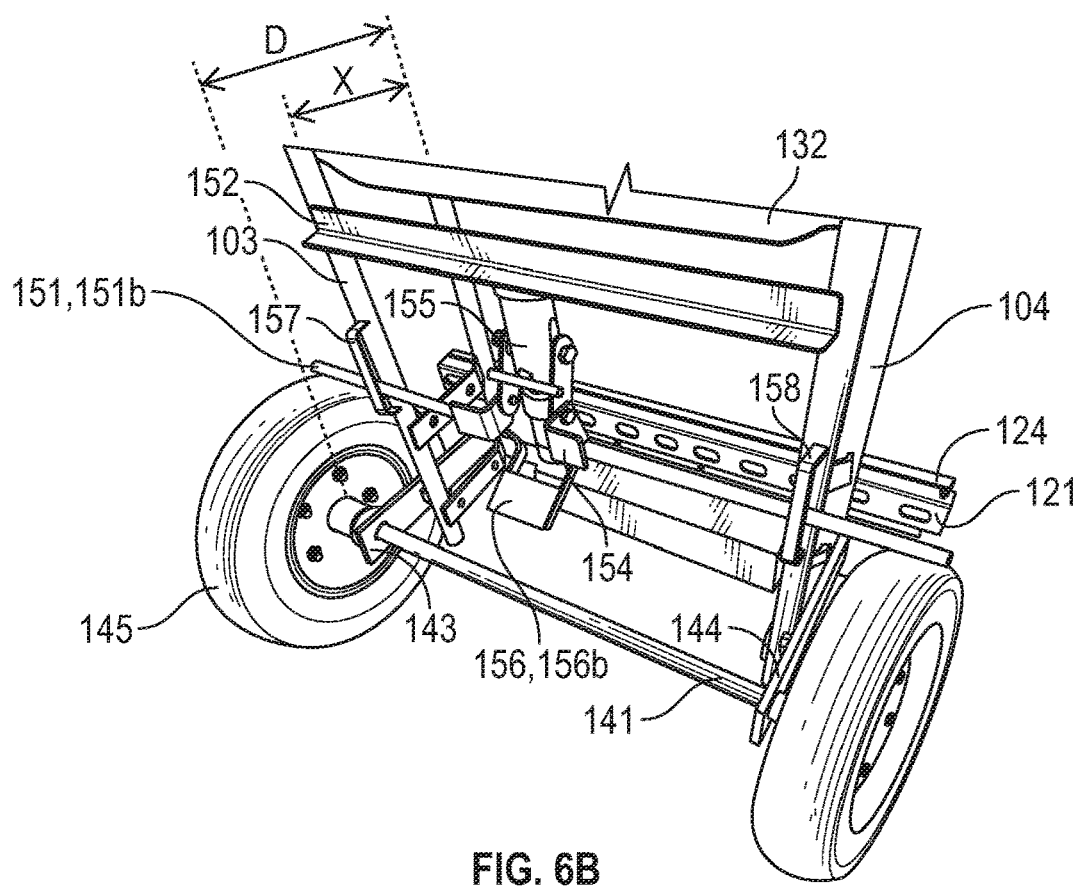

As shown in the drawings, the hand truck 100 may include axle mount members 143 and 144. The left axle mount member 143 attaches to at least one of the front portion 103.1 and the rear portion 103.2 of the left member 103. Similarly, the right axle mount member 144 attaches to at least one of the front portion 104.1 and the rear portion 104.2 of the right member 104. In some embodiments, the left axle mount member 143 and the right axle mount member 144 are mirror images of one another. The axle mount members 143 and 144 extend rearward to attach axle 141 rearward of the frame 101. In contrast, conventional hand trucks mount the axle immediately adjacent to the frame (i.e., close to or in between the front and rear frame portions). As shown in FIG. 6B, the distance between the front and rear frame portions (of left member 103 and right member 104) is defined as X. Due to the axle mount members 143 and 144, the distance D between the axle 141 and the front of the frame 101 is approximately 1.5×-3×. In addition, the axle mount members 143 and 144 are attached at an oblique angle relative to the frame 101 and thus relative to the ground (i.e., neither parallel nor perpendicular). In some embodiments, the axle mount members 143 and 144 are attached at an angle of approximately 75-89.9° with respect to the frame 101 (i.e., 0.1-15° from perpendicular) or any other appropriate angle. In some embodiments, the axle mount members 143 and 144 are attached at an angle of approximately 84° with respect to the frame 101 (i.e., 6° from perpendicular). The distance between the axle 141 and the feet 111 and 112 provides a larger more stable footprint compared to conventional hand trucks. This larger wheelbase (compared to conventional hand trucks), which is based on the length of the axle mount members 143 and 144, allows the hand truck 100 to stand upright with reduced risk of falling over. The hand truck 100 is less likely to fall over because the distance (in a direction approximately parallel to the surface of the ground) between the center of gravity of the object (such as a pane of glass 10) and the axle 141 is increased compared to conventional hand trucks.

The hand truck 100 may include a brake mechanism that includes a pedal 156, a compressible cylinder 155, and a lock bar 151. FIG. 6A shows a disengaged configuration for the brake mechanism and FIG. 6B shows an engaged configuration. As shown in FIG. 6A, the pedal 156 is in an up position 156*a* when the brake mechanism is in the disengaged configuration. To move the brake mechanism from the disengaged configuration to the engaged configuration, the user 11 pushes the pedal 156 from the up position 156*a* to the down position 156*b* (as shown in FIG. 6B) such that the pedal 156 rotates about the axis of the lock bar 151 (the lock bar 151 may or may not rotate with the pedal 156). When the pedal 156 is pushed down and rotates toward the engaged configuration, the lock bar 151 moves from its up position 151*a* (disengaged configuration, see FIG. 6A) toward its down position 151*b* (engaged configuration, see FIG. 6B). In the down position 151*b*, the lock bar 151 contacts at least one of the wheels 145, 146 to limit movement of the hand truck 100. The lock bar 151 is constrained to move within channels 157 and 158, which limit both (i) the minimum and maximum movement in the vertical direction (i.e., movement between the up position 151*a* and the down position 151*b*) and (ii) movement that is perpendicular to the frame. The brake mechanism may also include at least one resetting portion 154 that may be pressed to move from the engaged configuration back to the disengaged configuration. In some embodiments, the compressible cylinder 155 may include a biasing mechanism (including, for example, one or more of a detent, a spring, a hydraulic cylinder, or any other appropriate mechanism) that biases the components of the brake mechanism toward at least one of the disengaged configuration and the engaged configuration. A portion of the compressible cylinder 155 (such as the upper end) may be attached to a cross member 152.

The components of the hand truck 100 may be formed of materials including, but not limited to, steel, machined aluminum, carbon composite, plastic, thermoplastic, tool steel, aluminum, stainless steel, other plastic or polymer materials, other metallic materials, other composite materials, or other similar materials. Moreover, the components of the hand truck 100 may be attached to one another via suitable fasteners, which include, but are not limited to, screws, bolts, rivets, welding, brazing, adhesive, or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A hand truck comprising:
a frame;
a platform extending from a front side of the frame; and
at least two feet attached to an underside of the platform and forward of the front side of the frame, wherein a first foot of the at least two feet comprises a first height, and wherein a second foot of the at least two feet comprises a second height that is less than the first height,
wherein the hand truck comprises a standing configuration and a mobile configuration,
wherein, in the standing configuration, the first foot and the second foot contact a ground surface to support the hand truck such that the platform is arranged at an oblique angle with respect to the ground surface.

2. The hand truck of claim 1, wherein, in the standing configuration, the hand truck is self-supporting without human intervention.

3. The hand truck of claim 1, wherein the at least two feet are fixed and non-moving relative to the platform.

4. The hand truck of claim 1, wherein, in the mobile configuration, the first foot and the second foot do not contact the ground surface.

5. The hand truck of claim 1, further comprising:
a handle attached to a rear side of the frame;
at least one support member attached to the front side of the frame; and
an axle supporting a plurality of wheels, wherein the axle is attached to the frame.

6. The hand truck of claim 1, wherein the platform is arranged at an orthogonal angle relative to the frame.

7. A hand truck comprising:
a frame comprising a front side and a back side;
a platform extending from the front side of the frame; and
at least one foot attached to an underside of the platform,
wherein the hand truck comprises a standing configuration and a mobile configuration and is pivotable about a pivot axis between the standing configuration and the mobile configuration,
wherein the pivot axis is offset backwards relative to the back side of the frame and away from the front side of the frame,
wherein, in the standing configuration, the at least one foot contacts a ground surface to support the hand truck such that the platform is arranged at an oblique angle with respect to the ground surface and the hand truck is self-supporting without human intervention,
wherein the at least one foot comprises a plurality of feet,
wherein the plurality of feet comprises a first foot and a second foot,
wherein the first foot comprises a first height, and
wherein the second foot comprises a second height that is less than the first height.

8. The hand truck of claim 7, wherein the at least one foot is fixed and non-moving relative to the platform.

9. The hand truck of claim 7, wherein, in the mobile configuration, the at least one foot does not contact the ground surface.

10. The hand truck of claim 7, further comprising:
a handle attached to a rear side of the frame;
at least one support member attached to the front side of the frame; and
an axle supporting a plurality of wheels, wherein the axle is attached to the frame.

11. The hand truck of claim 7, wherein the platform is arranged at an orthogonal angle relative to the frame.

12. A hand truck comprising:
a frame;
a platform extending from a front side of the frame;
a movement mechanism supported on a back side of the frame; and
at least one foot attached to an underside of the platform, wherein the at least one foot is fixed and non-moving relative to the platform,
wherein the at least one foot does not include a movement mechanism of the hand truck,
wherein the hand truck comprises a standing configuration and a mobile configuration,
wherein, in the standing configuration, the at least one foot contacts a ground surface to support the hand truck such that the platform is arranged at an oblique angle with respect to the ground surface, and
wherein the platform is arranged at an orthogonal angle relative to the frame.

13. The hand truck of claim 12, wherein, in the standing configuration, the hand truck is self-supporting without human intervention.

14. The hand truck of claim 12, wherein the at least one foot comprises a plurality of feet.

15. The hand truck of claim 14, wherein the plurality of feet comprises a first foot and a second foot, wherein the first foot comprises a first height, and wherein the second foot comprises a second height that is less than the first height.

16. The hand truck of claim 12, wherein, in the mobile configuration, the at least one foot does not contact the ground surface.

17. The hand truck of claim 12, further comprising:
a handle attached to a rear side of the frame; and
at least one support member attached to the front side of the frame, and
wherein the movement mechanism comprises an axle supporting a plurality of wheels, wherein the axle is attached to the frame.

* * * * *